(12) United States Patent
Ohtsu et al.

(10) Patent No.: US 6,212,462 B1
(45) Date of Patent: Apr. 3, 2001

(54) AUTOMOTIVE BRAKE CONTROL SYSTEM WITH SKID CONTROL UNIT

(75) Inventors: Nobuyuki Ohtsu; Shigeyuki Tanikawa, both of Kanagawa (JP)

(73) Assignee: Unisia Jecs Corporation, Atsugi (JP)

(*) Notice: Subject to any disclaimer, the term of this patent is extended or adjusted under 35 U.S.C. 154(b) by 0 days.

(21) Appl. No.: 09/458,826

(22) Filed: Dec. 13, 1999

(30) Foreign Application Priority Data

Dec. 16, 1998 (JP) .................................................. 10-357804

(51) Int. Cl.[7] ........................................................ B60T 8/58
(52) U.S. Cl. ................................ 701/72; 701/74; 701/78; 180/197
(58) Field of Search ................................ 701/72, 74, 78, 701/29, 83, 76; 180/197; 303/122, 122.06, 155, 173

(56) References Cited

U.S. PATENT DOCUMENTS 5,575,543 * 11/1996 Pheonix ................................ 303/155

FOREIGN PATENT DOCUMENTS 10-16748   1/1998 (JP) .

* cited by examiner

Primary Examiner—Tan Nguyen
(74) Attorney, Agent, or Firm—Foley & Lardner

(57) ABSTRACT

An automotive brake control system with an ABS system employing a hydraulic modulator, wheel-speed sensors, a longitudinal acceleration sensor, and a skid control unit. The skid control unit includes a lateral acceleration dependent offset-value arithmetic-calculation section which arithmetically calculates an offset value based on lateral acceleration exerted on the vehicle. Also provided is a pseudo-vehicle-speed compensation section which decreasingly compensates for a pseudo vehicle speed (an estimated vehicle speed value) by compensating for a signal value of input information data from the longitudinal acceleration sensor by the offset value based on the lateral acceleration exerted on the vehicle owing to the turn, when the vehicle is decelerating.

6 Claims, 12 Drawing Sheets

FIG.7

| Vi | ΔVH | LATERAL-G OFFSET VALUE |
|---|---|---|
| <30km/h | ≧4km/h | 0.3g |
| | <4km/h | 0.2g |
| 100>Vi ≧30km/h | ≧3km/h | 0.4g |
| | <3km/h | 0.3g |
| 100km/h≦ | ≧2km/h | 0.5g |
| | <2km/h | 0.3g |

FIG.8B W/C PRESSURE

AUTOMOTIVE BRAKE CONTROL SYSTEM WITH SKID CONTROL UNIT

BACKGROUND OF THE INVENTION

1. Field of the Invention

The present invention relates to a brake control system for automotive vehicles, and specifically to a computer-controlled braking system with a skid control unit (an ABS unit) acting to prevent a wheel lock-up condition during vehicle deceleration and to provide maximum effective braking by virtue of a computer-controlled, regulated wheel-brake cylinder pressure based on a vehicle deceleration value determined by an input informational data signal from a longitudinal acceleration sensor, and especially suitable for four-wheel-drive vehicles.

2. Description of the Prior Art

As is well known, in typical skid control systems (ABS systems), rotational wheel speed sensors are employed at each road wheel to sense a rotational wheel speed Vw of each road wheel or rotational speeds Vw of at least front-left and front-right wheel speeds detected by two wheel speed sensors located at the front-left and front-right wheels, and a mean rear wheel speed detected by a wheel speed sensor mounted on the rear differential. The ABS system arithmetically calculates or estimates a so-called pseudo vehicle speed Vi on the basis of the wheel speeds detected by the wheel speed sensors, and also arithmetically calculates a pressure-reduction threshold value $\lambda 1$ on the basis of the estimated pseudo vehicle speed Vi. The pressure-reduction threshold value $\lambda 1$ is defined as a wheel speed value which may provide an optimal braking condition of the vehicle. Commonly, the ABS system functions to reduce a wheel-brake cylinder pressure within a wheel-brake cylinder of a road wheel which is subjected to skid control so as to prevent a wheel lock-up condition, when the wheel speed Vw of the road wheel subjected to the skid control reaches the pressure-reduction threshold value $\lambda 1$. In order for the ABS system to accurately calculate or estimate the pseudo vehicle speed Vi, the pseudo vehicle speed based on the wheel speeds Vw is generally compensated for by a deceleration rate (simply a deceleration) $\Delta$Vi. There are two typical ways of determining or deriving the deceleration $\Delta$Vi of the vehicle. One way of determining the deceleration $\Delta$Vi is arithmetic calculation of the deceleration based on the wheel-speed difference between front and rear road wheels. The other way is the use of a signal value from a longitudinal acceleration sensor, which will be hereinafter referred to as a "longitudinal G sensor". On four-wheel-drive automotive vehicles, there is a less tendency for a wheel-speed difference between the front and rear road wheels to occur. Thus, an ABS system mounted on the four-wheel-drive vehicle often uses an input information signal from the longitudinal G sensor, in determining the vehicle deceleration $\Delta$Vi. In such techniques that the pseudo vehicle speed Vi is compensated for by using a signal from the longitudinal G sensor, however, there may be an output (Xg) from the longitudinal G sensor during up-hill driving or during down-hill driving, even when the vehicle is running at a constant speed. The erroneous output from the longitudinal G sensor, occurring owing to the up-hill or down-hill driving, lowers the accuracy of arithmetic calculation for the pseudo vehicle speed Vi. To avoid this, Japanese Patent Provisional Publication No. 10-16748 teaches the use of an offset value corresponding to an inclination of a downhill or an uphill. That is, the output from the longitudinal G sensor, representative of a longitudinal acceleration or a longitudinal deceleration, is compensated for by the offset value. In the anti-skid control device disclosed in the Japanese Patent Provisional Publication No. 10-16748, when the output from the longitudinal G sensor varies during skid control (during ABS operation), an arithmetic and logic section of an electronic control unit (ECU) decides the presence or absence of a shifting action between actual road surface conditions (that is, a shifting action from a high friction coefficient road surface, often called a high-$\mu$ road, to a low friction coefficient road surface, often called a low-$\mu$ road, and vice versa), and also decides the presence or absence of a change in a gradient or an inclination of the slope (or a road slope rate) on which the vehicle is running. In order to enhance the accuracy of arithmetic calculation for the pseudo vehicle speed Vi, the anti-skid control device of the Japanese Patent Provisional Publication No. 10-16748 further compensates for the offset value only when the logic section determines there is a change in inclination of the slope.

SUMMARY OF THE INVENTION

The previously-discussed anti-skid control device disclosed in the Japanese Patent Provisional Publication No. 10-16748, contributes to compensation for the offset value used to compensate for the output value (Xg) from the longitudinal G sensor, during uphill or downhill driving. However, the Japanese Patent Provisional Publication No. 10-16748 fails to consider compensation for the offset value when the vehicle rounds a curve, or in the presence of outward drift especially at the rear road wheels of the vehicle during high-speed turning. In particular, when the brakes are applied during the vehicle turning or during high-speed turning with the outward drift at the rear of the vehicle, there are increased oversteer tendencies. With oversteer, the output value of the longitudinal G sensor tends to be reduced in comparison with an actual acceleration or deceleration rate of the vehicle, as appreciated from a simplified plan view of FIG. 12 showing the relationship among the longitudinal acceleration/deceleration Xg, the lateral acceleration/deceleration Yg, and the vehicle acceleration/deceleration $\Delta$Vcar being defined as a resultant force which is obtained by vectorially adding all of the lateral (Yg) and longitudinal (Xg) acceleration/decelerations. In the presence of oversteer tendencies during braking action, if such a somewhat-reduced output value from the longitudinal G sensor is used as a deceleration rate of the pseudo vehicle speed Vi, that is, a time rate-of-change $\Delta$Vi (simply the vehicle deceleration) of the pseudo vehicle speed, the vehicle deceleration $\Delta$Vi is estimated as a smaller value than the actual deceleration rate $\Delta$Vcar of the vehicle. In other words, as shown in FIGS. 13A and 13B, the pseudo vehicle speed Vi (see the uppermost solid line of FIG. 13A) is undesirably estimated to be higher than the actual vehicle speed Vcar. As a result of this, during skid control, the difference between the pseudo vehicle speed Vi and the wheel speed difference Vw of each of the road wheels is overestimated. Owing to such overestimation, a timing (a pressure-reduction mode start timing) that the wheel speed Vw reaches the pressure-reduction threshold value $\lambda 1$ is advanced, and thus the pressure-reduction operating mode is initiated at the undesirable timing. As a consequence, there is a possibility of excessive pressure reduction (that is, a lack of braking force). Also, there is a possibility that the overestimated pressure-reduction threshold value $\lambda 1$ gives the driver a poor brake feel, as if there is no stroke of the brake pedal in spite of the driver's brake-pedal depression (in comparison with a degree of reaction force or push-back force pushed back through the brake pedal and transmitted to the foot of the driver). To avoid this, it is possible to increasingly correct the offset value based on the output value from the longitudinal G sensor. In this case, there is another problem of the pseudo vehicle speed Vi underestimated in comparison with the actual vehicle speed Vcar. During straight-ahead driving, the underestimated pseudo vehicle speed, causes the pressure-reduction timing to retard, because the wheel speed Vw does not easily reduce to below the pressure-reduction threshold value λ1 based on the estimated pseudo vehicle speed Vi. This reduces directional stability of the vehicle.

Accordingly, it is an object of the invention to provide an automotive brake control system with an anti-skid control unit which avoids the aforementioned disadvantages of the prior art.

It is another object of the invention to provide an automotive brake control system with an anti-skid control unit, which is capable of avoiding an early wheel lock-up condition during skid control (during ABS operation) and of optimizing a pressure-reduction timing, and of reconciling the satisfactory braking force and the increased directional stability of the vehicle, while enhancing the accuracy of arithmetic calculation of the pseudo vehicle speed by accurately compensating for the output value from a longitudinal G sensor.

In order to accomplish the aforementioned and other objects of the present invention, an automotive brake control system, comprises a hydraulic modulator capable of regulating wheel-brake cylinder pressures of each of road wheels of an automotive vehicle, independently of each other, wheel-speed sensors detecting wheel speeds of each of the road wheels, a longitudinal acceleration sensor detecting longitudinal acceleration and deceleration exerted on the vehicle, and a skid control unit configured to be electronically connected to the wheel-speed sensors and the longitudinal acceleration sensor for estimating a pseudo vehicle speed based on input information data from the wheel-speed sensors and the longitudinal acceleration sensor, and electronically configured to the hydraulic modulator for operating the hydraulic modulator in response to the pseudo vehicle speed estimated and the wheel speeds detected to prevent a wheel lock-up condition of each of the road wheels, the skid control unit comprising a wheel-speed difference arithmetic-calculation section arithmetically calculating a wheel-speed difference between left and right road wheels from among the road wheels, a decision section discriminating a turning degree of the vehicle, on the basis of the wheel-speed difference arithmetically calculated at a beginning of braking action, a lateral-acceleration arithmetic-calculation section arithmetically calculates lateral acceleration exerted on the vehicle on the basis of at least the wheel-speed difference, an offset-value arithmetic-calculation section arithmetically calculating an offset value based on the lateral acceleration, and a pseudo-vehicle-speed compensation section decreasingly compensating for the pseudo vehicle speed by compensating for a signal value of the input information data from the longitudinal acceleration sensor by the offset value based on the lateral acceleration exerted on the vehicle owing to the turn, when the vehicle is decelerating. It is preferable that the lateral-acceleration arithmetic-calculation section arithmetically calculates the lateral acceleration on the basis of both the wheel-speed difference and informational data which data is representative of vehicle speed obtained at the beginning of braking action. As the informational data representative of vehicle speed, the pseudo vehicle speed estimated at the beginning of braking action may be used. Preferably, the offset-value arithmetic-calculation section determines the offset value (VIDOFS) depending on whether the wheel-speed difference (ΔVH) is greater than or equal to a first threshold value (4 km/h) during a low- and middle-speed turn that the informational data representative of vehicle speed is less than a predetermined middle vehicle speed (30 km/h), and determines the offset value (VIDOFS) depending on whether the wheel-speed difference (ΔVH) is greater than or equal to a second threshold value (3 km/h) less than the first threshold value (4 km/h) during a middle- and high-speed turn that the informational data representative of vehicle speed is greater than or equal to the predetermined middle vehicle speed (30 km/h) and less than a predetermined high vehicle speed (100 km/h), and determines the offset value (VIDOFS) depending on whether the wheel-speed difference (ΔVH) is greater than or equal to a third threshold value (2 km/h) less than the second threshold value (3 km/h) during a super-high-speed turn that the informational data representative of vehicle speed is greater than the predetermined high vehicle speed (100 km/h). More preferably, the offset-value arithmetic-calculation section may set the offset value (VIDOFS) at 0.3 g when the wheel-speed difference (ΔVH) is greater than or equal to the first threshold value (4 km/h) during the low- and middle-speed turn, at 0.2 g when the wheel-speed difference (ΔVH) is less than the first threshold value (4 km/h) during the low- and middle-speed turn, at 0.4 g when the wheel-speed difference (ΔVH) is greater than or equal to the second threshold value (3 km/h) during the middle- and high-speed turn, at 0.3 g when the wheel-speed difference (ΔVH) is less than the second threshold value (3 km/h) during the middle- and high-speed turn, at 0.5 g when the wheel-speed difference (ΔVH) is greater than or equal to the third threshold value (2 km/h) during the super-high-speed turn, and at 0.3 g when the wheel-speed difference (ΔVH) is less than the third threshold value (2 km/h) during the super-high-speed turn. Hereupon, g denotes a gravitational acceleration unit. When the vehicle is decelerating, preferably, the pseudo-vehicle-speed compensation section may arithmetically calculate a compensated pseudo vehicle speed $Vi_{(n)}$ from a predetermined expression $Vi_{(n)}=Vi_{(n-1)}-\{(|Xg|+VIDOFS)/T_{10}\}$, where $Vi_{(n)}$ denotes the compensated pseudo vehicle speed, $Vi_{(n-1)}$ denotes a previous value of the pseudo vehicle speed extracted at each cycle of skid control, $|Xg|$ denotes an absolute value of the signal value of the input information data from the longitudinal acceleration sensor, VIDOFS denotes the offset value, and $T_{10}$ denotes a predetermined time interval corresponding to each cycle of skid control.

BRIEF DESCRIPTION OF THE DRAWINGS

FIG. 7 is a preprogrammed look-up table illustrating the relationship among the pseudo vehicle speed Vi, the wheel-speed difference ΔVH, and the lateral-G offset value (VIDOFS), used in the system of the embodiment.

FIGS. 8A and 8B are timing charts illustrating simulation results pertaining to variations in the pseudo vehicle speed Vi, variations in the actual vehicle speed Vcar, variations in the wheel speed Vw, and variations in the wheel-brake cylinder pressure W/C, with compensation for the longitudinal-G sensor output value (Xg) based on the lateral-G offset value (VIDOFS), performed within the system of the embodiment.

DESCRIPTION OF THE PREFERRED EMBODIMENTS

Figure 1:
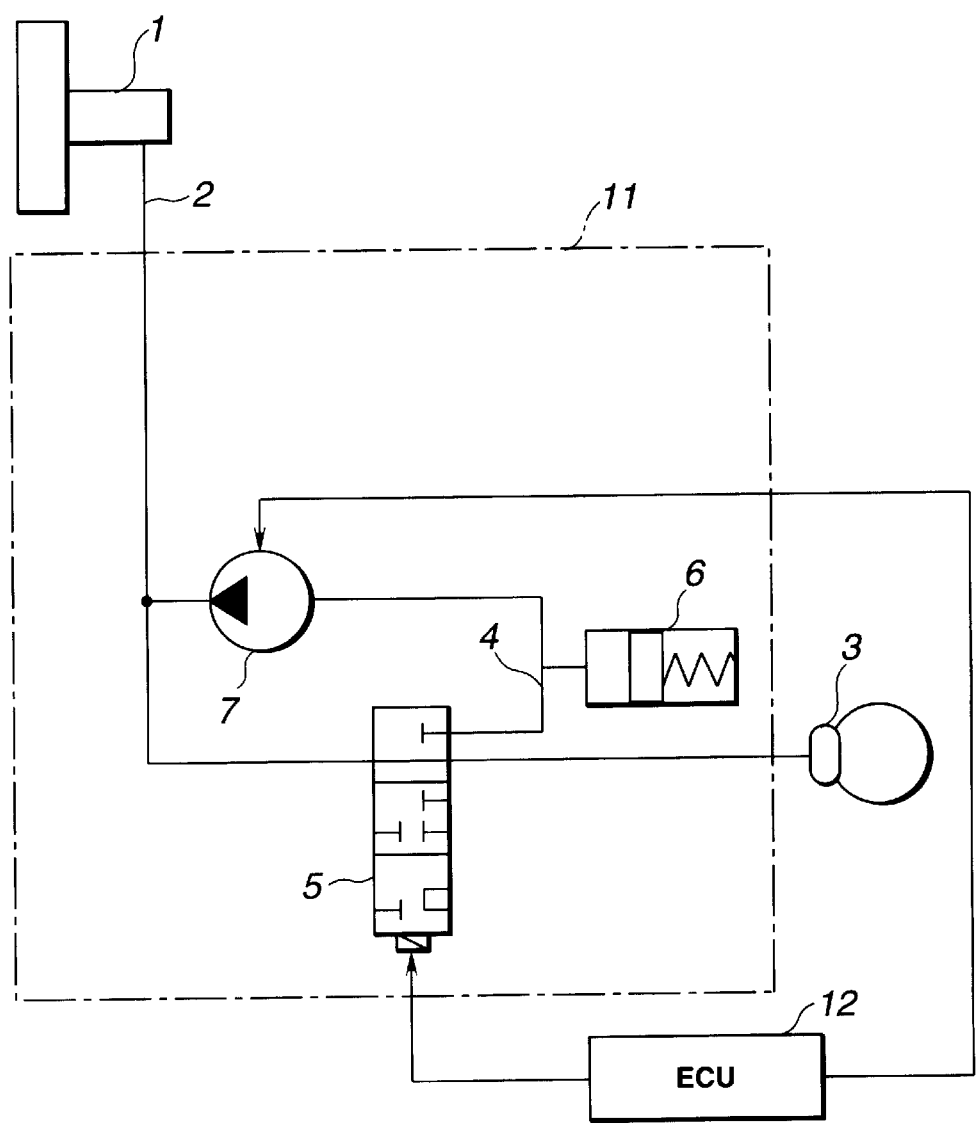
FIG. 1 is an automotive brake control system block diagram of an embodiment.
Figure 2:
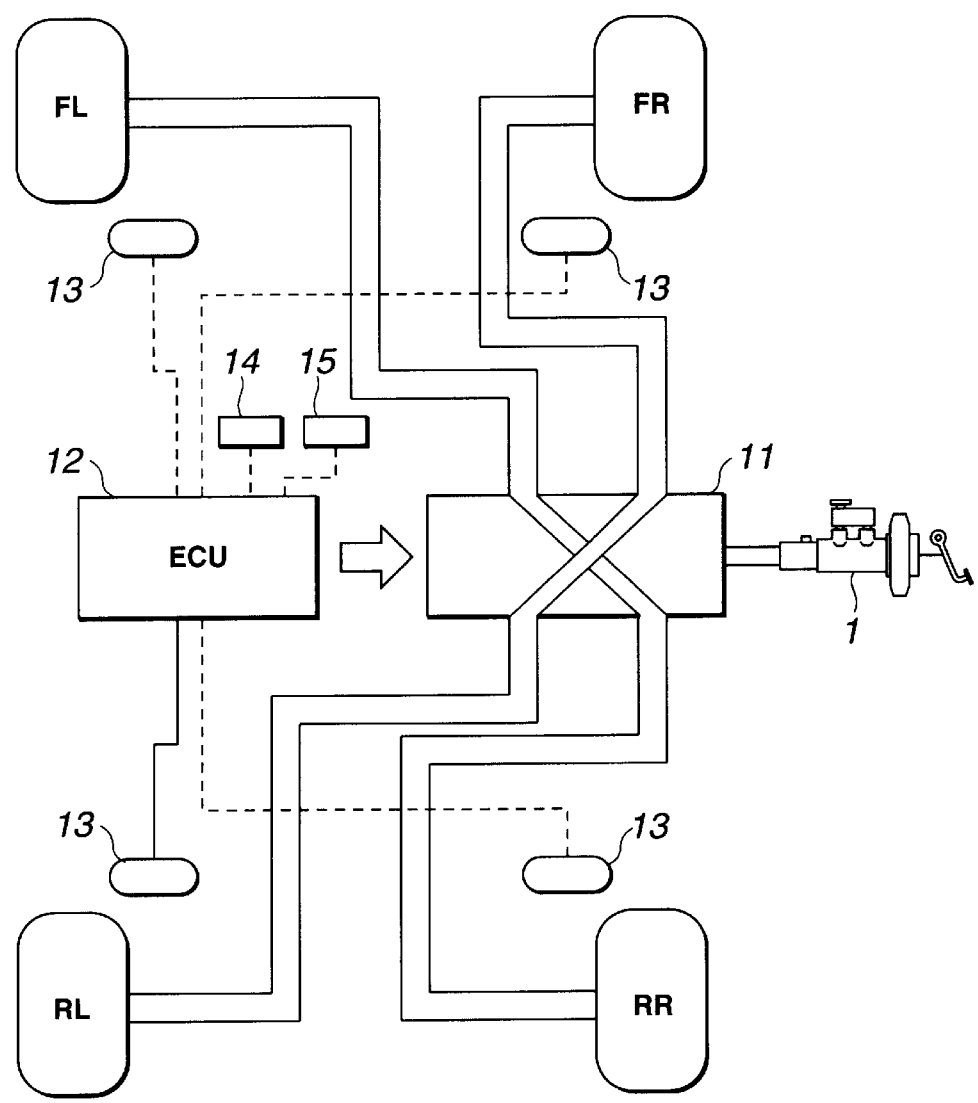
FIG. 2 shows an example of the brake control system of the embodiment which is adapted to an automotive vehicle with a four-channel ABS diagonal brake-circuit layout.

Referring now to the drawings, particularly to FIGS. 1 and 2, the automotive brake control system of the invention is exemplified in an automotive vehicle equipped with a four-channel ABS diagonal brake-circuit layout. In FIGS. 1 and 2, 1 denotes a master cylinder. The master cylinder 1 may be constructed by a typical tandem master cylinder with two pistons in tandem. For the purpose of illustrative simplicity, FIG. 1 merely shows the connection relationship of an ABS closed loop control circuit containing a hydraulic brake control unit (or a hydraulic modulator) 11 with respect to only one of the four wheel-brake cylinders. As the brake pedal is depressed, the piston in the master cylinder 1 applies pressure to brake fluid. The pressure forces the brake fluid through the inlet/outlet port of the master cylinder 1 into a hydraulic brake circuit 2. Then, the pressure is regulated by means of the hydraulic modulator 11 fluidly disposed in the hydraulic brake circuit 2, and the regulated pressure is supplied to the wheel-brake cylinder 3. The hydraulic modulator 11 includes at least a drain circuit 4, and a directional control valve 5. In order to properly regulate or control the brake-fluid pressure to the wheel-brake cylinder 3, the directional control valve 4 is designed to switch among three operating modes, namely a first operating mode or a pressure build-up mode where the upstream side (the master-cylinder side) of the brake circuit 2 is communicated with the downstream side (the wheel-brake cylinder side) of the brake circuit 2, a second operating mode or a pressure-reduction mode where the brake fluid in the wheel-brake cylinder 3 is relieved within toward the drain circuit 4, and a third operating mode or a pressure-hold mode where the brake circuit 2 is shut off and thus the brake-fluid pressure in the wheel-brake cylinder 3 is held constant. For the purpose of illustrative simplicity, although only one directional control valve 5 is shown in FIG. 1, actually, as can be appreciated from the simplified arrangement of the four-channel ABS system for diagonal brake-circuit layout shown in FIG. 2, the hydraulic modulator 11 has a plurality of directional control valves usually comprised of electromagnetic solenoid valves, so as to independently regulate the fluid pressure to each individual wheel cylinder. Also, the hydraulic modulator 11 has a pressure accumulator 6 disposed in each drain circuit 4, and a return pump 7, often called an "ABS pump". The pressure accumulator 6 is designed to temporarily store energy by holding the surplus brake fluid, which will occur anytime that there is a drop in system pressure (especially during the pressure-reduction mode). The return pump 7 is designed to carry or return the brake fluid flowing from the wheel-brake cylinders 3 via the individual accumulators 6 into the correct circuit of the master cylinder 1 (i.e., the upstream side of the directional control valve 5). With the previously arrangement of the ABS system shown in FIGS. 1 and 2, the brake-fluid pressure to each wheel-brake cylinder can be properly regulated or controlled. The operation (switching among valve positions) of the directional control valve 5 associated with each wheel-brake cylinder 3 and the operation (switching between inoperative and operative states) of the return pump 7 are electrically controlled by means of an electronic control unit (ECU) or an electronic control module (ECM) or a skid control unit 12. The electronic control unit 12 usually comprises a microcomputer. Although it is not clearly shown in FIG. 2, the electronic control unit 12 includes a central processing unit (CPU) that performs necessary arithmetic-calculations, processes informational data, compares signals from the sensors to preprogrammed threshold values, and makes necessary decisions of acceptance, memories (RAM, ROM), and an input/output interface. Actually, the ECU 12 performs various data processing actions shown in FIGS. 3 through 7 which will be fully described later. The input interface of the control unit 12 receives input informational data from various engine/vehicle sensors/switches, that is, four wheel speed sensors (13, 13, 13, 13), a longitudinal acceleration sensor 14, and a brake switch 15. The four wheel speed sensors 13 placed at the respective road wheels (FL, FR, RR, RL) are provided to continuously monitor or detect each individual wheel's rotational speed and relay this signal to the input interface of the electronic control unit 12. The longitudinal acceleration sensor 14 is placed at the vehicle body, to continuously monitor or detect longitudinal acceleration/deceleration Xg exerted on the vehicle. The brake switch 15 is designed to generate a switched-ON signal (or a high-voltage signal) when the brake pedal is depressed and thus the brakes are applied. Conversely, when the brake pedal is undepressed and thus the brakes are released, the input interface of the ECU 12 receives a switched-OFF signal (or no electrical signal) from the brake switch 15. The memories store preprogrammed or predetermined data such as various threshold values and temporarily stores the results of arithmetic-calculations and the necessary decisions made by the CPU. The output interface of the ECU 12 is configured to be electronically connected to each directional control valve 5 of the hydraulic modulator 11, to produce a control command signal to the directional control valve 5 associated with each individual wheel-brake cylinder 3 as well as the return pump 7, on the basis of the results of arithmetic-calculations and decisions performed by the CPU.

Hereunder described in detail is the skid control routine (shown in FIG. 3) executed by the brake control system of the embodiment and preprogrammed in the CPU of the electronic control unit 12.

In step S1, the more recent wheel speed indicative data signal (that is, the latest up-to-date information being received from the four wheel speed sensors 13), are read, and then a wheel speed Vw at each road wheel (a front-right wheel speed VwFR, a front-left wheel speed VwFL, a rear-right wheel speed VwRR, and a rear-left wheel speed VwRL) is arithmetically calculated. Then, an acceleration/deceleration rate (simply an acceleration/deceleration $\Delta$Vw) at each road wheel (a front-right wheel acceleration/deceleration $\Delta$VwFR, a front-left wheel acceleration/deceleration $\Delta$VwFL, a rear-right wheel acceleration/deceleration $\Delta$VwRR, and a rear-left wheel acceleration/deceleration $\Delta$VwRL) is arithmetically calculated. In step S2, a pseudo vehicle speed Vi is arithmetically calculated or determined by a predetermined or pre-programmed arithmetic processing which will be fully described later in reference to each of the flow charts shown in FIGS. 4, 9, and 11. In step S3, a vehicle deceleration $\Delta$Vi is arithmetically calculated or determined by a predetermined expression $\Delta Vi = Vi_{(n-1)} - Vi_{(n)}$, where $Vi_{(n-1)}$ denotes a previous value of the pseudo vehicle speed Vi, whereas $Vi_{(n)}$ denotes a current value (a more recent data) of the pseudo vehicle speed Vi. The previous value $Vi_{(n-1)}$ corresponds to a pseudo vehicle speed value one cycle before in comparison with the current arithmetic-calculation routine for the pseudo vehicle speed Vi. In step S4, a pressure-reduction threshold value $\lambda 1$ is arithmetically calculated from the following expression.

$$\lambda 1 = Vi \times K - x \text{ (unit: Km/h)}$$

where K denotes a constant such as 0.95, and x denotes a correction value being variable depending on whether the road-surface condition corresponds to high-$\mu$ road or low-$\mu$ road (concretely, in the shown embodiment, the correction value x is set at 8 during vehicle driving on the high-$\mu$ road, and set at 4 during vehicle driving on the low-$\mu$ road).

In step S5, each of the wheel speeds (VwFR, VwFL, VwRR, VwRL) is compared to the pressure-reduction threshold value $\lambda 1$, and a check is made to determine whether the respective wheel speed Vw is less than the pressure-reduction threshold value $\lambda 1$. When the answer to step S5 is in the affirmative (YES), i.e., in case of Vw<$\lambda 1$, the program proceeds to steps S7. Conversely, when the answer to step S5 is in the negative (NO), i.e., in case of Vw$\geq \lambda 1$, the program proceeds to step S6. In step S6, each of the wheel acceleration/deceleration values ($\Delta$VwFR, $\Delta$VwFL, $\Delta$VwRR, $\Delta$VwRL) is compared to a predetermined pressure-hold threshold value $\lambda 2$, and a check is made to determine whether the respective wheel acceleration/deceleration $\Delta$Vw is less than the pressure-hold threshold value $\lambda 2$. When the answer to step S6 is affirmative (YES), i.e., in case of $\Delta$Vw<$\lambda 2$, step S9 occurs. Conversely, when the answer to step S6 is negative (NO), i.e., in case of $\Delta$Vw $\geq \lambda 2$, step S8 occurs. The acceleration/deceleration value $\Delta$Vw at each road wheel is defined as the time rate of change of each of the wheel speeds (VwFR, VwFL, VwRR, VwRL). Thus, when the inequality $\Delta$Vw<$\lambda 2$ is satisfied in step S6, the CPU of the electronic control unit 12 determines or decides that the wheel speed Vw is almost equal to the pseudo vehicle speed Vi, and then the procedure flows to step S9, so as to execute the pressure-hold mode (or the pressure-hold control) with the directional control valve (the solenoid valve) 5 held at its pressure-holding valve position. In contrast, when the inequality $\Delta$Vw$\geq \lambda 2$ is satisfied in step S6, the CPU of the ECU 12 decides that the wheel speed Vw is returning to the pseudo vehicle speed Vi, and thus the procedure flows to step S8, so as to execute the pressure build-up mode (or the pressure build-up control) with the control valve 5 held at its pressure-increasing valve position. On the other hand, when the inequality Vw<$\lambda 1$ is satisfied in step S5, the CPU of the ECU 12 decides that a skid (a wheel lock-up condition) starts to develop, and thus the procedure flows to step S7, so as to execute the pressure-reduction mode (or the pressure-reduction control) with the control valve 5 held at its pressure-decreasing valve position.

Subsequently to steps S7, S8, or S9, step S10 occurs. In step S10, a test is made to determine whether a predetermined time period $T_{10}$ such as 10 msec has been elapsed from the beginning of the current skid-control routine. When the answer to step S10 is affirmative (YES), the program returns to step S1, so as to execute the next cycle following the current cycle. In other words, the arithmetic processing or the skid control routine shown in FIG. 3 is executed as time-triggered routines to be triggered every predetermined intervals such as 10 msec.

Figure 3:
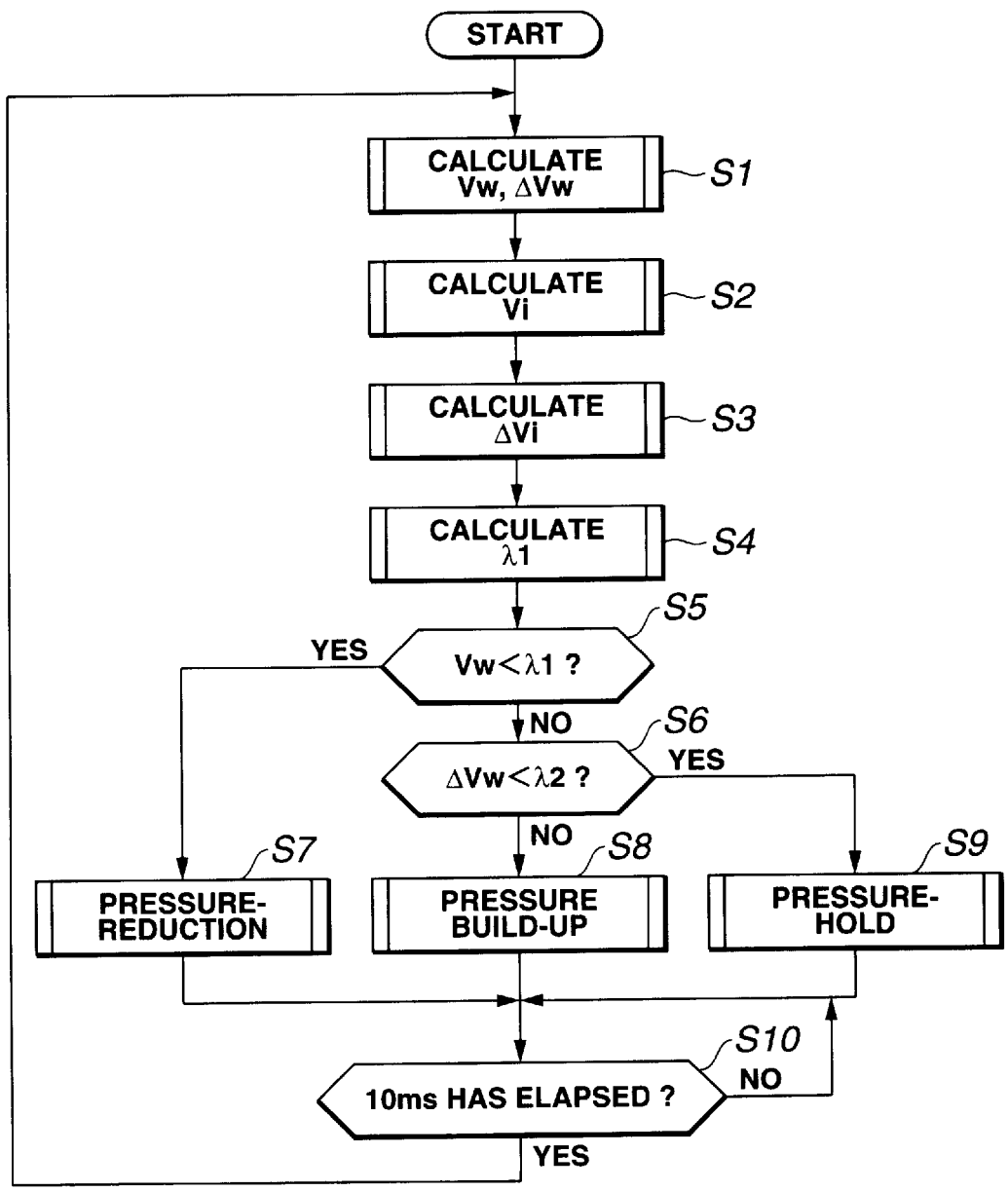
FIG. 3 is a flow chart illustrating a main routine of skid control (ABS control) executed by the brake control system of the embodiment.
Figure 4:
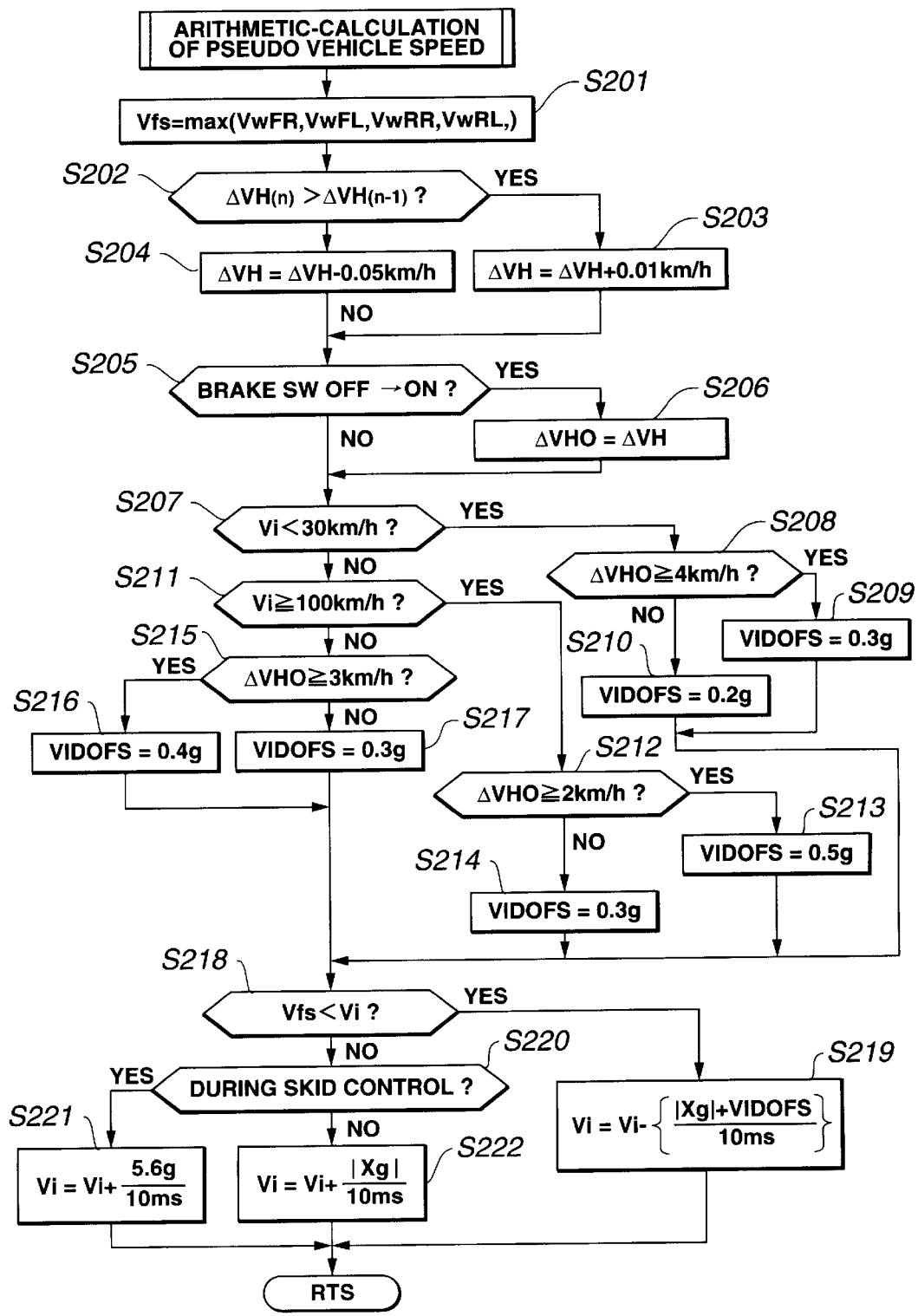
FIG. 4 is a flow chart illustrating an arithmetic-calculation routine for the pseudo vehicle speed Vi, executed within the system of the embodiment.

Referring now to FIG. 4, there is shown an example of a pseudo vehicle speed (Vi) arithmetic-calculation sub-routine, related to step S2 of FIG. 3.

In step S201, a selected value Vfs is selected as a highest one of the four wheel speed data VwFR, VwFL, VwRR, and VwRL by way of a so-called select-HIGH process max (VwFR, VwFL, VwRR, VwRL). The selected value Vfs serves as a reference value needed to determine a pseudo vehicle speed Vi at each cycle of the pseudo-vehicle-speed arithmetic-calculation routine. In step S202, an absolute value |VwFR−VwFL| of the wheel-speed difference (VwFR−VwFL) between the front-right wheel speed VwFR and the front-left wheel speed VwFL, is arithmetically calculated at the current cycle of pseudo-vehicle-speed (Vi) arithmetic-calculation routine. The absolute value |VwFR−VwFL| of the wheel-speed difference can be regarded as a difference in wheel travel between the inner and outer wheels. The difference in wheel travel between the inner and outer wheels will be hereinafter referred to simply as a "wheel-travel difference". In the shown embodiment, the difference in wheel travel between the outer-front and inner-front road wheels is used as the wheel-travel difference $\Delta$VH. Also, the absolute value |VwFR−VwFL| of the wheel-speed difference (VwFR−VwFL), calculated at the current cycle, will be hereinafter referred to as a "current wheel-speed difference $\Delta VH_{(n)}$" or as a "current wheel-travel difference $\Delta VH_{(n)}$" especially during turning. The absolute value |VwFR−VwFL| of the wheel-speed difference (VwFR−VwFL), calculated one cycle before, will be hereinafter referred to as a "previous wheel-speed difference $\Delta VH_{(n-1)}$" or a "previous wheel-travel difference $\Delta VH_{(n-1)}$"

especially during turning. In step S202, a test is made to determine whether the current wheel-speed difference $\Delta VH_{(n)}$ is greater than the previous wheel-speed difference $\Delta VH_{(n-1)}$. When the answer to step S202 is in the affirmative ($\Delta VH_{(n)} > \Delta VH_{(n-1)}$), step S203 occurs. In step S203, the wheel-speed difference indicative data $\Delta VH$ is increased by 0.01 km/h and thus updated by a value defined by ($\Delta VH_{(n-1)}+0.01$ km/h). That is, the current value $\Delta VH_{(n)}$ of the wheel-speed difference data $\Delta VH$ is represented by the expression $\Delta VH_{(n)} = \Delta VH_{(n-1)}+0.01$ km/h through step S203. Conversely, when the answer to step S202 is in the negative ($\Delta VH_{(n)} \leq \Delta VH_{(n-1)}$), step S204 occurs. In step S204, the wheel-speed difference indicative data $\Delta VH$ is decreased by 0.05 km/h and thus updated by a value defined by ($\Delta VH_{(n-1)}-0.05$ km/h). That is, the current value $\Delta VH_{(n)}$ of the wheel-speed difference data $\Delta VH$ is represented by the expression $\Delta VH_{(n)} = \Delta VH_{(n-1)}-0.05$ km/h through step S204. Thereafter, the routine proceeds to step S205. In step S205, a test is made to determine whether the brake switch 15 is changed from its switched-off state to its switched-on state. When the answer to step S205 is affirmative (OFF→ON), step S206 occurs. In step S206, a limit value $\Delta VH0$ is set at the wheel-speed difference $\Delta VH$. When the answer to step S205 is negative (NO), the routine flows from step S205 to step S207 not through step S206. In step S207, a test is made to determine whether the pseudo vehicle speed Vi is less than a predetermined middle vehicle speed such as 30 km/h. Note that the pseudo vehicle speed data Vi (the estimated vehicle speed data) of step S207 and step S211 (described later) is used as informational data representative of vehicle speed, extracted from the memory at the time t0 when the braking action (or the deceleration) starts. When the condition defined by the inequality Vi<30 km/h is satisfied at step S207, step S208 occurs. In step S208, a check is made to determine whether the limit value $\Delta VH0$ (the current wheel-speed difference $\Delta VH_{(n)}$) is above a first threshold value such as 4 km/h. When the answer to step S208 is affirmative (YES), that is, in case of Vi<30 km/h and $\Delta VH0 \geq 4$ km/h, step S209 occurs. In step S209, an offset value VIDOFS is set at 0.3 g (g denotes a gravitational acceleration unit). When the answer to step S208 is negative (NO), that is, in case of Vi<30 km/h and $\Delta VH0$<4 km/h, step S210 occurs. In step S210, the offset value is set at 0.2 g. On the other hand, when the answer to step S207 is negative (Vi$\geq$30 km/h), the routine proceeds to step S211. In step S211, a test is made to determine whether the pseudo vehicle speed Vi is above a predetermined high vehicle speed such as 100 km/h. In case of Vi<100 km/h, step S215 occurs. In step S215, a test is made to determine whether the limit value $\Delta VH0$ (the current wheel-speed difference $\Delta VH_{(n)}$) is above a second threshold value such as 3 km/h. When the answer to step S215 is affirmative (YES), that is, in case of 30 km$\leq$Vi<100 km/h and $\Delta VH0 \geq 3$ km/h, step S216 occurs. In step S216, the offset value VIDOFS is set at 0.4 g. When the answer to step S215 is negative (NO), that is, in case of 30 km$\leq$Vi<100 km/h and $\Delta VH0$<3 km/h, step S217 occurs. In step S217, the offset value is set at 0.3 g. In case of Vi$\geq$100 km/h, step S212 occurs. In step S212, a test is made to determine whether the limit value $\Delta VH0$ (the current wheel-speed difference $\Delta VH_{(n)}$) is above a third threshold value such as 2 km/h. When the answer to step S212 is affirmative (YES), that is, in case of Vi$\geq$100 km/h and $\Delta VH0 \geq 2$ km/h, step S213 occurs. In step S213, the offset value VIDOFS is set at 0.5 g. When the answer to step S212 is negative (NO), that is, in case of Vi$\geq$100 km/h and $\Delta VH0$<2 km/h, step S214 occurs. In step S214, the offset value is set at 0.3 g. As regards the setting of the previously-discussed first (4 km/h), second (3 km/h), and third (4 km/h) threshold values for the limit value $\Delta VH0$, in the shown embodiment, these threshold values are predetermined or preprogrammed so that the second threshold value is less than the first threshold value, and the third threshold value is less than the second threshold value. After the setting of the offset value VIDOFS is completed via either one of steps S209, S210, S213, S214, S216, and S217, the routine advances to step S218. In step S218, a test is made to determine whether the selected value (the reference value) Vfs is less than the pseudo vehicle speed Vi extracted from the memory of the ECU 12 at the current arithmetic-calculation routine. The pseudo vehicle speed Vi extracted at step S218 corresponds to the previous value $Vi_{(n-1)}$ of the pseudo vehicle speed Vi. When the answer to step S218 is affirmative (that is, Vfs<Vi), the CPU of the ECU 12 determines that the vehicle is decelerating, and thus the routine proceeds to step S219. In step S219, the current value $Vi_{(n)}$ of the pseudo vehicle speed is arithmetically calculated from a predetermined expression $Vi_{(n)}=Vi_{(n-1)}-\{(|Xg|+VIDOFS)/T_{10}\}$, where $Vi_{(n)}$ denotes the current value of the pseudo vehicle speed or the properly compensated pseudo vehicle speed, $Vi_{(n-1)}$ denotes the previous value of the pseudo vehicle speed, |Xg| denotes the absolute value of the longitudinal-G sensor output value, VIDOFS denotes the offset value, and $T_{10}$ denotes the predetermined time period such as 10 milliseconds. Conversely, when the answer to step S218 is negative (Vfs$\geq$Vi), the routine flows from step S218 to step S220. In step S220, a check is made to determine whether the ABS system is conditioned in its operative state (that is, the skid control mode is executed). When the answer to step S220 is affirmative (YES), that is, during ABS operation (during skid control), the CPU of the ECU 12 determines that the vehicle is accelerating, and thus step S221 occurs. In step S221, the current value $Vi_{(n)}$ of the pseudo vehicle speed is arithmetically calculated from a predetermined expression $Vi_{(n)}=Vi_{(n-1)}+5.6$ g/$T_{10}$. When the answer to step S220 is negative (NO), step S222 occurs. In step S222, the current value $Vi_{(n)}$ of the pseudo vehicle speed is arithmetically calculated from a predetermined expression $Vi_{(n)}=Vi_{(n-1)}+(|Xg|/T_{10})$.

Figure 5:
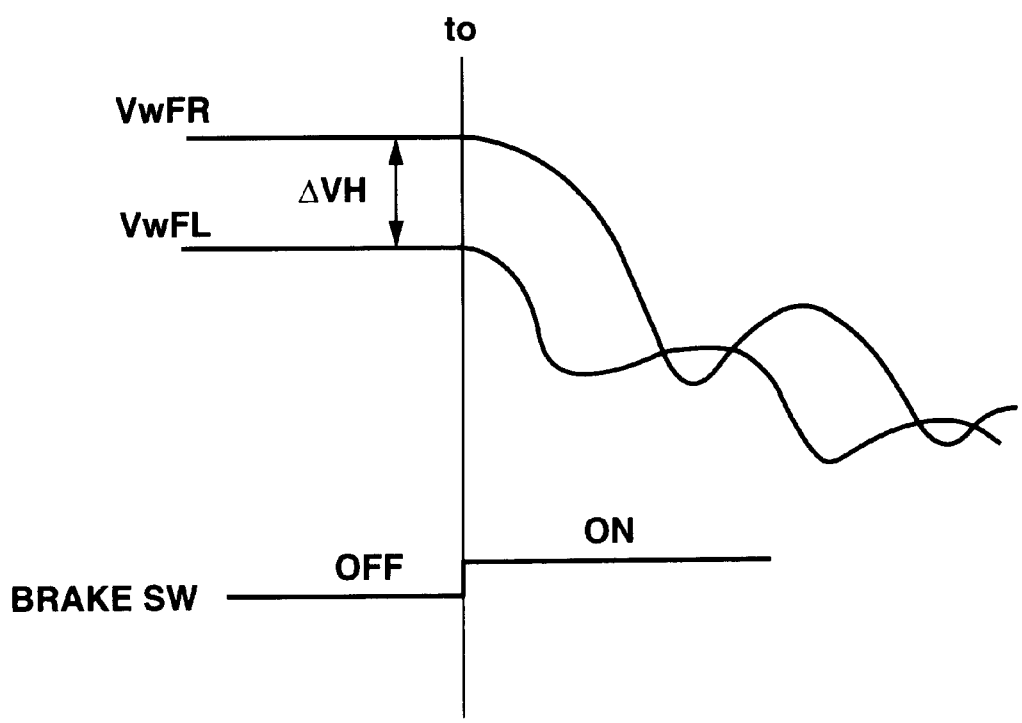
FIG. 5 is a timing chart illustrating the relationship among variations in the front-right wheel speed VwFR, variations in the front-left wheel speed VwFL, and a signal level of the output generated from the brake switch, on a left-hand turn.

The operation of the brake control system of the embodiment is hereunder described in detail in reference to the timing chart shown in FIG. 5. The timing chart shown in FIG. 5 is simulation results obtained on the assumption that the brakes are applied when the vehicle is turning to the left. In FIG. 5, the two thick solid curves respectively indicate variations in the front-right wheel speed VwFR and the front-left wheel speed VwFL, whereas the lower solid line indicates variations in the output signal from the brake switch 15. During such a vehicle turn, there is a wheel speed difference $\Delta VH$ between the wheel speed VwFR of the front-right wheel turning on a relatively large radius and the wheel speed VwFL of the front-left wheel turning on a relatively small radius. In the example shown in FIG. 5, the left-hand turn is made, and thus, as a whole, the front-right wheel speed VwFR becomes above the front-left wheel speed VwFL. Under such a left-hand side turning state, when the brakes are applied, the brake switch 15 is changed from the switched-OFF state to the switched-ON state. At the beginning of the braking action, the skid control is not yet executed. Until the time t0, the wheel speeds are stable. Under these conditions, the moment the brakes are applied at the time t0, the vehicle is still coasting, turning on the predetermined turning radius. For a while, the wheel speed difference $\Delta VH$ is dependent on the turning radius of the vehicle. After the brakes are applied at the time t0, suppose the ABS system comes into operation or the outward drift takes place at the rear of the vehicle. As soon as the skid control is started, or owing to the occurrence of the outward drift, the wheel-speed difference ΔVH is not dependent upon the turning radius of the vehicle.

Figure 6:
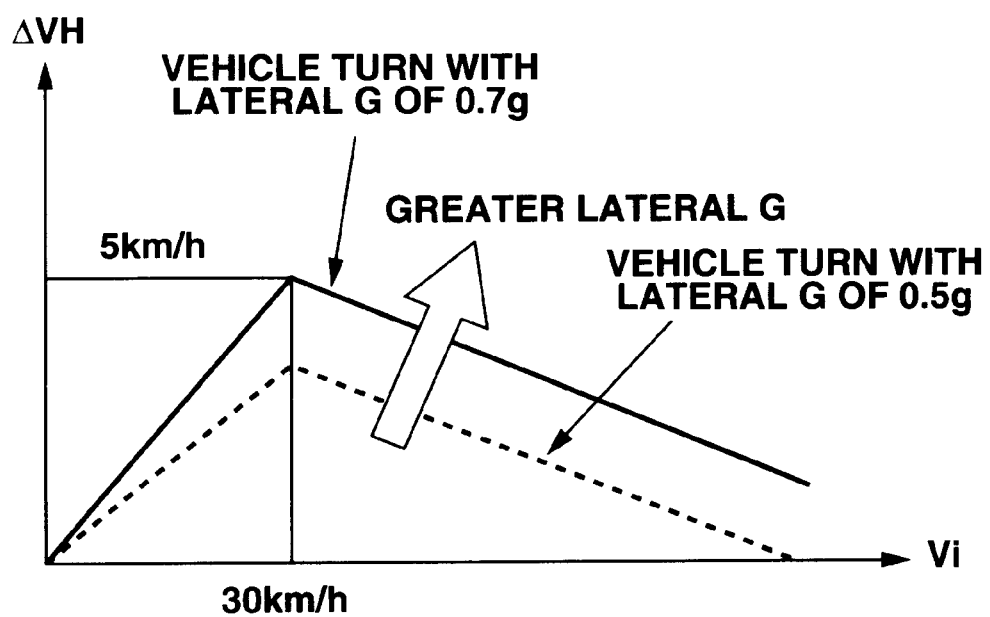
FIG. 6 is a lateral-G characteristic map showing the relationship among the wheel-speed difference ΔVH between the right and left wheel speeds (VwFR, VwFL), the pseudo vehicle speed Vi, and the lateral acceleration/deceleration (Yg), used in the system of the embodiment.

Referring now to FIG. 6, there is shown the lateral-G characteristic map showing how the lateral acceleration/deceleration Yg has to be varied relative to the pseudo vehicle speed Vi and the wheel-speed difference ΔVH (or the wheel-travel difference ΔVH). That is, in the system of the embodiment, the lateral acceleration/deceleration value Xg is arithmetically calculated or retrieved on the basis of both the pseudo vehicle speed Vi and the wheel-speed difference ΔVH, from the preprogrammed map data shown in FIG. 6. In the lateral-G characteristic map data shown in FIG. 6, the uppermost solid polygonal line indicates a characteristic line showing the relationship among the pseudo vehicle speed Vi, the wheel-speed difference ΔVH, and the lateral acceleration Yg, during 0.7 g turning. On the other hand, the lowermost broken line indicates a characteristic line showing the relationship among the pseudo vehicle speed Vi, the wheel-speed difference ΔVH, and the lateral acceleration Yg, during 0.5 g turning. As can be appreciated from the characteristic map data of FIG. 6, assuming that the wheel-speed difference ΔVH is same, the lateral acceleration value Yg becomes a minimum value at the pseudo vehicle speed Vi of 30 km/h (consider points of intersection each of the polygonal lines and the horizontal line). Additionally, the lateral-G characteristic map is preprogrammed, so that the lateral acceleration value Xg decreases as the wheel-speed difference ΔVH decreases, and so that the lateral acceleration value Xg increases as the pseudo vehicle speed Vi gradually decreases from 30 km/h, and so that the lateral acceleration value Xg increases as the pseudo vehicle speed Vi gradually increases from 30 km/h. For the purpose of illustrative simplicity, although only the two polygonal lines, namely the 0.5 g-lateral-G characteristic line and the 0.7 g-lateral-G characteristic line, are indicated in FIG. 6, actually, a 0.2 g-lateral-G characteristic line, a 0.3 g-lateral-G characteristic line, and a 0.4 g-lateral-G characteristic line are further plotted in FIG. 6. The number of the necessary lateral-G characteristic lines may be properly increased within a memory capacity of the ECU 12. As a matter of course, the lateral-G arithmetic calculation section of the ECU can be constructed, so that a value interpolated between the map data can be retrieved even when the pseudo vehicle speed Vi and the wheel-speed difference ΔVH are arbitrary values. In this manner, the ECU 12 arithmetically calculates or estimates the lateral acceleration value Xg by the predetermined lateral-G characteristic map shown in FIG. 6. The previously-noted lateral-G characteristic map is produced on the assumption that the lateral acceleration/deceleration Yg is commonly dependent upon both the vehicle speed as well as the wheel-speed difference (the vehicle turning radius), and the road wheels (especially, the rear road wheels) experience outward drift at high vehicle speeds and thus the lateral acceleration/deceleration Yg is almost unaffected by the turning radius (the wheel-speed difference ΔVH) and varies depending on the vehicle speed rather than the wheel-speed difference (the turning radius). The ECU incorporated in the system of the embodiment also retrieves a lateral-G dependent offset value (simply, a lateral-G offset value) from the look-up table of FIG. 7, showing how the lateral-G offset value has to be varied or set relative to the pseudo vehicle speed Vi and the wheel-speed difference ΔVH. As can be appreciated from the predetermined look-up table shown in FIG. 7, under a condition of Vi<30 km/h and ΔVH≧4 km/h, the lateral-G offset value is set at 0.3 g (see step S209 of FIG. 4). Under a condition of Vi<30 km/h and ΔVH<4 km/h, the lateral-G offset value is set at 0.2 g (see step S210 of FIG. 4). Under a condition of 30 km≦Vi<100 km/h and ΔVH ≧3 km/h, the lateral-G offset value is set at 0.4 g (see step S216 of FIG. 4). Under a condition of 30 km≦Vi<100 km/h and ΔVH<3 km/h, the lateral-G offset value is set at 0.3 g (see step S217 of FIG. 4). Under a condition of Vi≧100 km/h and ΔVH≧2 km/h, the lateral-G offset value is set at 0.5 g (see step S213 of FIG. 4). Under a condition of Vi≧100 km/h and ΔVH<2 km/h, the lateral-G offset value is set at 0.3 g (see step S214 of FIG. 4). As discussed above in reference to the map data shown in FIG. 6 and the look-up table shown in FIG. 7, in order to accurately set at a value suitable for lateral G actually exerting on the vehicle, and to enhance the accuracy of estimation of the pseudo vehicle speed Vi, and to consequently enhance the accuracy of skid control, the lateral-G offset value (VIDOFS) is determined on the basis of both the vehicle speed data and the wheel-speed difference data ΔVH.

Figure 8A:
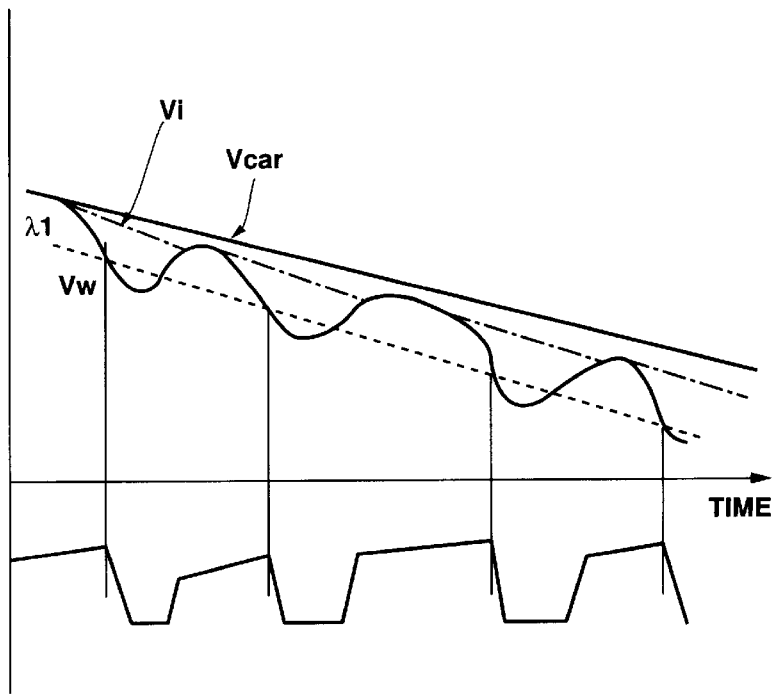

With the previously-noted arrangement of the system of the embodiment, as shown in FIG. 5, when the brakes are applied during turning, and thus the vehicle is decelerated, the pseudo-vehicle-speed arithmetic-calculation routine flows from step S218 to step S219. In step S219, the pseudo vehicle speed is updated by the predetermined value defined by $[Vi_{(n-1)}-\{(|Xg|+VIDOFS)/T_{10}\}]$. That is to say, during the vehicle deceleration on turns), an absolute value |Xg| of the longitudinal G sensor output value Xg is compensated for by the lateral-G offset value VIDOFS. As set out above, the lateral-G offset value VIDOFS is determined depending on the lateral acceleration/deceleration Yg which is estimated or retrieved from the preprogrammed map of FIG. 6 showing the specified relationship among the pseudo vehicle speed Vi, the wheel-speed difference ΔVH (or the wheel-travel difference or the limit value ΔVH0), and the lateral G (Yg), at the time t0 when the brakes are applied (i.e., the brake switch 15 is switched ON) (see the flow from step S205 to step S206 in FIG. 4). Thus, the absolute value |Xg| of the longitudinal G sensor output value Xg is increasingly compensated for by the lateral-G offset value VIDOFS, even when the vehicle experiences oversteer during the turn and thus outward drift develops at the rear of the vehicle. As appreciated, when decelerating, the absolute value |Xg| means a deceleration rate (vehicle deceleration) itself. As a consequence, the vehicle deceleration ΔVi can be estimated as a value closer to the actual deceleration ΔVcar of the vehicle, but not be underestimated, even when the brakes are applied during a turn. FIGS. 8A and 8B shows simulation results of the pseudo vehicle speed Vi and the wheel-brake cylinder pressure, with compensation for the longitudinal-G sensor output value Xg (exactly, the absolute value |Xg| of the longitudinal-G sensor output value). As appreciated from the timing chart of FIG. 8A, during skid control, the pseudo vehicle speed Vi is properly decreasingly compensated for by a value corresponding to the lateral-G offset value VIDOFS (see the one-dotted line of FIG. 8A). Thus, there is less tendency that the estimated pseudo vehicle speed Vi exceeds the actual vehicle speed Vcar. This prevents undesirable pressure-reduction processing. As discussed above, the lateral-G offset value VIDOFS is determined depending upon both the pseudo vehicle speed Vi and the wheel-speed difference ΔVH (or the limit value ΔVH0). Therefore, a drop in output from the longitudinal G sensor 14 which drop will occur owing to lateral acceleration actually exerting on the vehicle, can be accurately compensated for by virtue of the lateral-G offset value. That is, the addition of the lateral-G offset value VIDOFS to the longitudinal-G sensor output value contributes to prevention of the delay in a pressure-reduction timing as well as avoidance of an early wheel lock-up condition during the skid control on a turn.

Referring now to FIGS. 9, and 10A–10D, there is shown a modification of the automotive brake control system of the invention. In the offset value VIDOFS discussed in the above-mentioned embodiment (shown in FIGS. 1–8B) is explained as a lateral-G dependent offset value. On the other hand, the offset value VIDOFS used in the system of the modification is different from the previously-noted lateral-G offset value, in that the offset value VIDOFS of the modification is set or determined depending on a gradient (or an inclination) of the road surface on which the vehicle is running, at the time t0 when the brake switch 15 is switched ON. In the modified system, the pseudo vehicle speed Vi is estimated by way of a pseudo-vehicle-speed arithmetic-calculation routine shown in FIG. 9.

Figure 9:
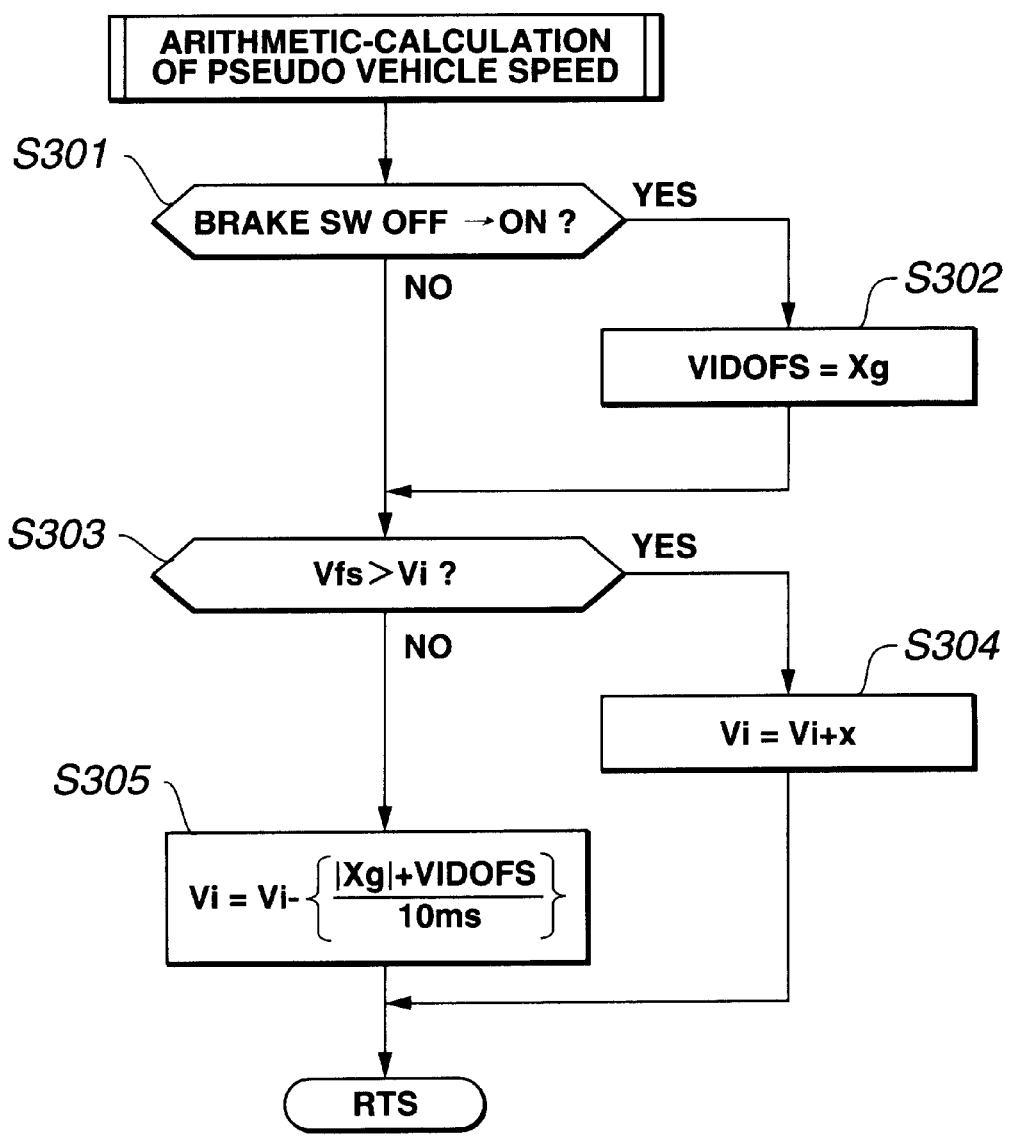
FIG. 9 is a flow chart illustrating an arithmetic-calculation routine for the pseudo vehicle speed Vi, executed within a modified automotive brake control system.
Figure 10:
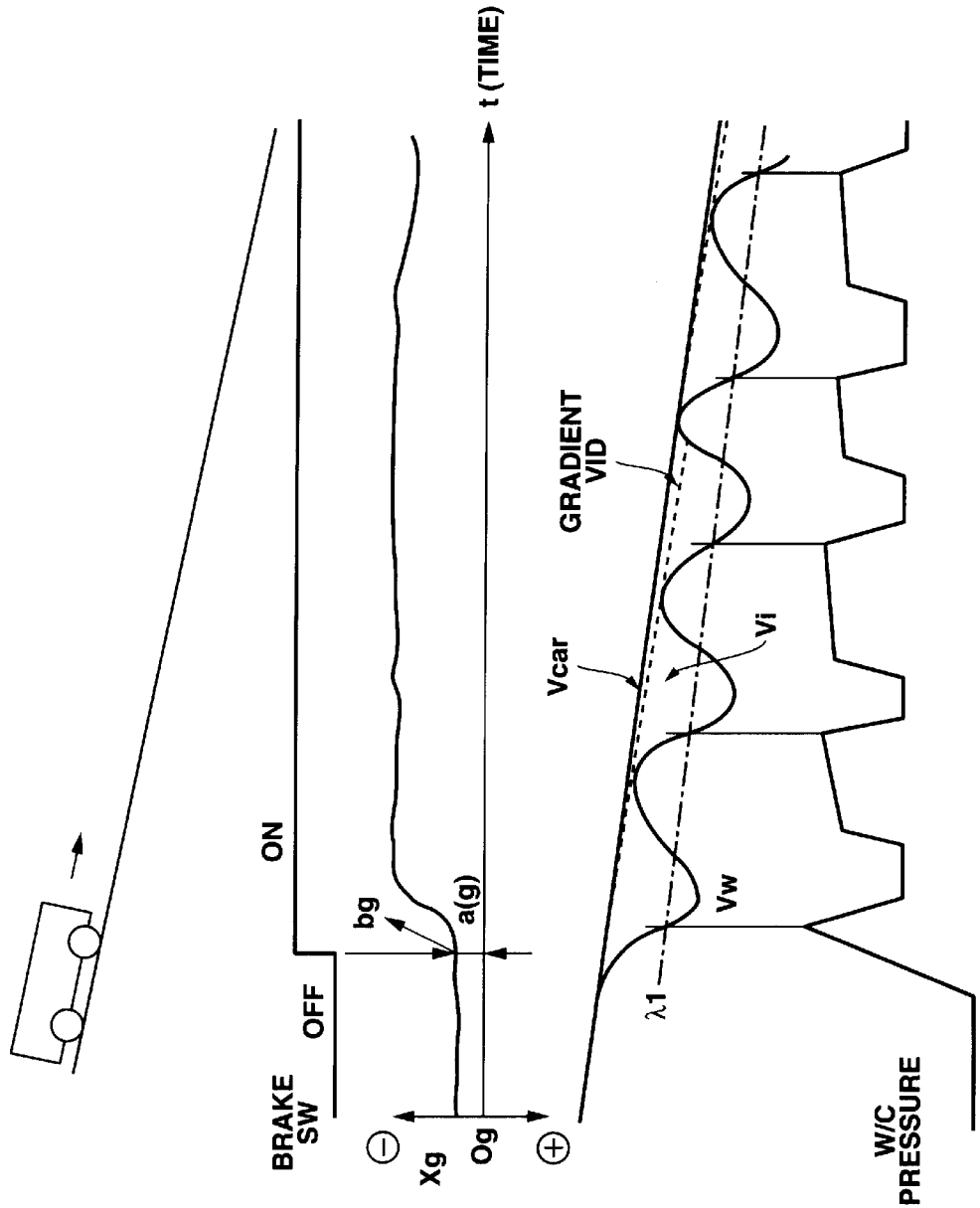
FIGS. 10A through 10D are timing charts illustrating simulation results pertaining to a signal level of the output generated from the brake switch, variations in the longitudinal acceleration/deceleration Xg (corresponding to the longitudinal-G sensor output value), variations in the pseudo vehicle speed Vi, variations in the actual vehicle speed Vcar, variations in the wheel speed Vw, and variations in the wheel-brake cylinder pressure W/C, with compensation for the longitudinal-G sensor output value (Xg) based on the inclination dependent offset value (VIDOFS) obtained at the timing t0 when the brakes are applied during downhill driving, performed within the system of the modification.

In step S301 of FIG. 9, a test is made to determine whether the brake switch 15 is changed from its switched-OFF state to its switched-ON state. When the answer to step S301 is affirmative (YES), step S302 occurs. In step S302, the longitudinal-G sensor output value Xg itself is regarded as or set at an offset value VIDOFS. When the answer to step S301 is negative (NO), the routine flows to step S303 not through step S302. In step S303, first, the selected value Vfs is determined by way of the select-HIGH process max (VwFR, VwFL, VwRR, VwRL). Second, the selected value Vfs (i.e., the select-HIGH wheel speed) is compared with the pseudo vehicle speed Vi. When the selected value Vfs exceeds the pseudo vehicle speed Vi, that is, in case of Vfs>Vi, the CPU of the ECU 12 determines that the vehicle is accelerating, and thus the routine proceeds to step S304. Instep S304, the current value $Vi_{(n)}$ of the pseudo vehicle speed is calculated from a predetermined expression $Vi_{(n)} = Vi_{(n-1)} + x$, where $Vi_{(n)}$ denotes the current value of the pseudo vehicle speed, $V_{(n-1)}$ denotes the previous value of the pseudo vehicle speed, and x denotes a constant (a predetermined fixed value). Conversely, when the answer to step S303 is negative (Vfs≦Vi), step S305 occurs. In step S305, the current value $Vi_{(n)}$ of the pseudo vehicle speed is arithmetically calculated from a predetermined expression $Vi_{(n)} = Vi_{(n-1)} - \{(|Xg| + VIDOFS)/T_{10}\}$, where $Vi_{(n)}$ denotes the current value of the pseudo vehicle speed, $Vi_{(n-1)}$ denotes the previous value of the pseudo vehicle speed, $|Xg|$ denotes the absolute value of the longitudinal-G sensor output value, VIDOFS denotes the offset value, and $T_{10}$ denotes the predetermined time period such as 10 milliseconds. According to the system of the modification, as can be appreciated from the timing charts shown in FIGS. 10A–10D, when the brakes are applied for example during down-hill driving, the longitudinal-G sensor output value Xg is regarded as a value corresponding to a gradient (or an inclination) of the road surface, at the time t0 when the brake switch 15 becomes switched ON. In other words, the offset value VIDOFS used in the system of the modification means a road-surface inclination dependent offset value (simply, an inclination dependent offset value). Therefore, the longitudinal-G sensor output value Xg (consequently, the pseudo vehicle speed V) can be properly compensated for depending on the degree of an inclination of the road surface on which the vehicle is traveling, and depending on whether the vehicle is traveling on the uphill road or on the downhill road. For example, during the downhill driving, as seen in FIGS. 10A and 10B, the longitudinal-G sensor output Xg indicates a(g) (g denotes a gravitational acceleration unit) owing to the inclination of the downhill, just before the brakes are applied. Then, the moment the brakes are applied and the brake switch is switched ON, the sensor output value Xg rapidly varies from the value a(g) toward a deceleration rate of b(g). According to the system of the modification, the longitudinal-G sensor output value Xg can be properly corrected by the inclination dependent offset value a(g). Thus, as seen in FIG. 10B, the pseudo vehicle speed Vi (indicated by the broken line) becomes closer to the actual vehicle speed Vcar (indicated by the solid line), and held slightly below the actual vehicle speed Vcar. The inclination dependent offset value VIDOFS prevents an undesired drop in the pseudo vehicle speed Vi (that is, an excessive drop in the pressure-reduction threshold value λ1) which drop may occur owing to an overestimated longitudinal-G sensor output value Xg during the downhill driving. This effectively prevents the early wheel lock-up condition. The inclination dependent offset value VIDOFS also prevents an undesired rise in the pseudo vehicle speed Vi (that is, an excessive rise in the pressure-reduction threshold value λ1) which rise may occur owing to an underestimated longitudinal-G sensor output value Xg during the uphill driving. This prevents the pressure-reduction timing from being undesiredly advanced, thus avoiding a lack of braking force. It will be easily understood that the brake control system of the invention can be constructed to use the inclination dependent offset value as well as the lateral-G dependent offset value.

Figure 11:
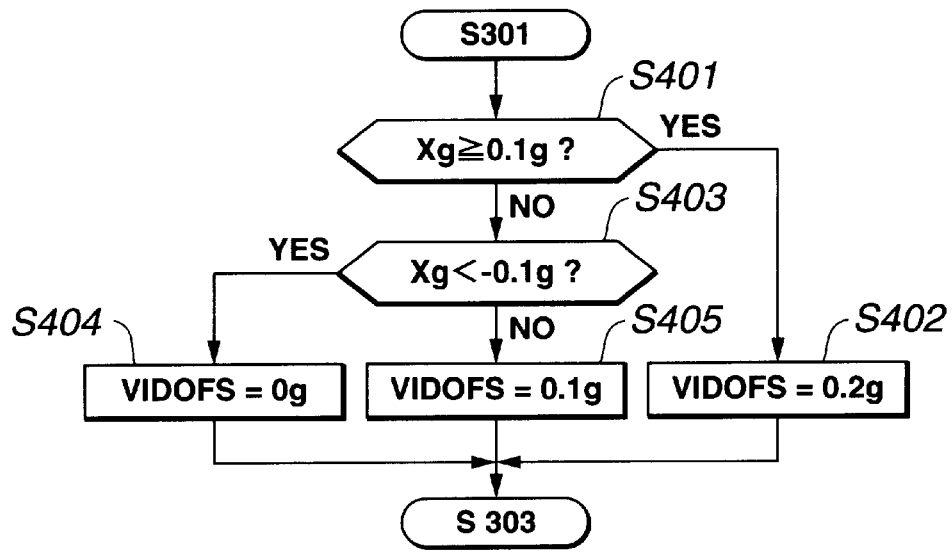
FIG. 11 is a flow chart illustrating another arithmetic-calculation routine for the pseudo vehicle speed Vi (especially, the inclination dependent offset value VIDOFS), executed within the modified automotive brake control system.
Figure 12:
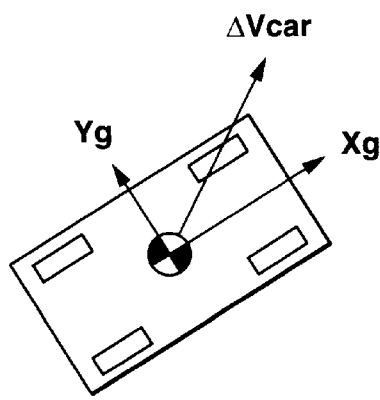
FIG. 12 is a plan illustrating the relationship among the longitudinal acceleration Xg, the lateral acceleration Yg, and the vehicle acceleration ΔVcar.
Figures 13A, 13B:
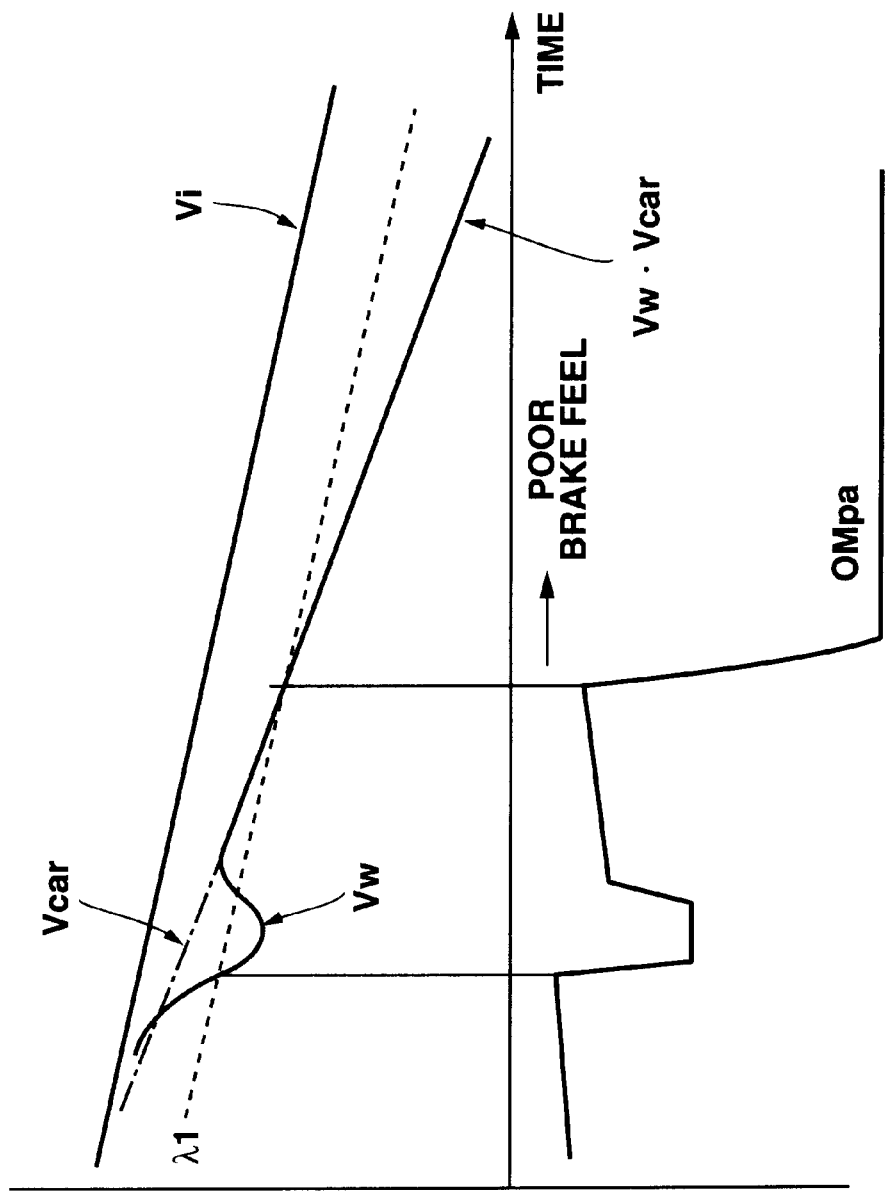
FIGS. 13A and 13B are timing charts illustrating simulation results pertaining to variations in the pseudo vehicle speed Vi, variations in the actual vehicle speed Vcar, variations in the wheel speed Vw, and variations in the wheel-brake cylinder pressure W/C, with no compensation for the longitudinal-G sensor output value Xg, during vehicle turning, or especially in the presence of outward drift at the rear road wheels on turns.

In lieu of the setting of the inclination dependent offset value VIDOFS achieved by the flow from step S301 to step S302 in FIG. 9, the inclination dependent offset value VIDOFS may be set or determined in accordance with the flow chart shown in FIG. 11.

After step S301 outputs the affirmative answer, in place of steps S302, a series of steps S401 through S405 are executed. That is, in step S401, a test is made to determine whether the longitudinal-G sensor output value Xg is greater than or equal to a predetermined positive value such as +0.1 g. When the condition of Xg≧+0.1 g is satisfied, the routine proceeds to step S402. In step S402, the inclination dependent offset value VIDOFS is set at 0.2 g. When the answer to step S401 is negative (Xg<+0.1 g), the routine flows to step S403. In step S403, a check is made to determine whether the longitudinal-G sensor output value Xg is less than a predetermined negative value such as –0.1 g. In case of Xg<–0.1 g, step S404 occurs. In step S404, the inclination dependent offset value VIDOFS is set at 0 g. On the other hand, when the answer to step S403 is negative (–0.1 g≦Xg<+0.1 g), the routine proceeds to step S405. In step S405, the inclination dependent offset value VIDOFS is set at 0.1 g. According to the system capable of further performing the modified routine shown in FIG. 11, the inclination dependent offset value VIDOFS can be properly set or determined depending on whether the vehicle is driving on the uphill, on the downhill, or on the flat road (or on the plain road). This highly enhances the accuracy of arithmetic calculation for the pseudo vehicle speed Vi. As will be appreciated from the above, in the brake control system of the invention, a turning degree or a turning state is detected or judged on the basis of the wheel-speed difference (the wheel-travel difference) ΔVH corresponding to the vehicle turning radius. Additionally, on the basis of at least the wheel-speed difference ΔVH, a value of lateral acceleration exerting on the vehicle is estimated, and thus a lateral-G dependent offset value (VIDOFS) is determined. On the basis of the lateral-G offset value (VIDOFS), the longitudinal-G sensor output value (Xg) is compensated for by the value of lateral acceleration (Yg) exerting on the vehicle owing to the vehicle turning. By virtue of the compensated longitudinal-G sensor output value, the pseudo vehicle speed Vi is arithmetically calculated or accurately estimated from a predetermined expression $Vi_{(n)}=Vi_{(n-1)}-\{(|Xg|+VIDOFS)/T_{10}\}$. That is, during deceleration, the wheel speed Vw can be corrected by the corrected longitudinal-G sensor output value regarded as an actual vehicle deceleration $\Delta Vcar$. This enhances the accuracy of arithmetic calculation for the pseudo vehicle speed Vi. As a result, it is possible to prevent the early wheel lock-up condition during skid control and the delay in pressure-reduction, thus avoiding the problem of lack of braking force, and the problem of a poor brake feel that there is no stroke of the brake pedal in spite of the driver's brake-pedal depression. That is, the system of the invention can reconcile the satisfactory braking force and increased directional stability of the vehicle. According to the system of the invention, the lateral-G dependent offset value (VIDOFS) is determined based on both the wheel-speed difference $\Delta VH$ and the estimated vehicle speed data (the pseudo vehicle speed data $Vi_{(n-1)}$) extracted from the memory at the time (t0) when the braking action starts. This highly enhances the accuracy of estimation or arithmetic-calculation for the pseudo vehicle speed $(Vi_{(n)})$. As the estimated vehicle speed data, instead of the pseudo vehicle speed $(Vi_{(n-1)})$, a wheel speed Vw of a predetermined road wheel may be used. Alternatively, the system may use a sensor signal (Vss) from a vehicle speed sensor which is generally located at either a transmission or transaxle (on front-wheel drive vehicles) to monitor the output shaft speed to the road wheels. In the shown embodiment, the lateral-G dependent offset value (VIDOFS) is properly determined by way of information retrieval from a preprogrammed map data (see FIGS. 6 and 7). The information retrieval from the map data is reliable and simple in system construction, thus, as a whole, reducing production costs of the system.

The entire contents of Japanese Patent Application No. P10-357804 (filed Dec. 16, 1998) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automotive brake control system, comprising:

a hydraulic modulator capable of regulating wheel-brake cylinder pressures of each of road wheels of an automotive vehicle, independently of each other;

wheel-speed sensors detecting wheel speeds of each of the road wheels;

a longitudinal acceleration sensor detecting longitudinal acceleration and deceleration exerted on the vehicle; and a skid control unit configured to be electronically connected to said wheel-speed sensors and said longitudinal acceleration sensor for estimating a pseudo vehicle speed based on input information data from said wheel-speed sensors and said longitudinal acceleration sensor, and electronically configured to said hydraulic modulator for operating said hydraulic modulator in response to the pseudo vehicle speed estimated and the wheel speeds detected to prevent a wheel lock-up condition of each of the road wheels; said skid control unit comprising:

(a) a wheel-speed difference arithmetic-calculation section arithmetically calculating a wheel-speed difference between left and right road wheels from among the road wheels, (b) a decision section discriminating a turning degree of the vehicle, on the basis of the wheel-speed difference arithmetically calculated at a beginning of braking action, (c) a lateral-acceleration arithmetic-calculation section arithmetically calculates lateral acceleration exerted on the vehicle on the basis of at least the wheel-speed difference, (d) an offset-value arithmetic-calculation section arithmetically calculating an offset value based on the lateral acceleration, and (e) a pseudo-vehicle-speed compensation section decreasingly compensating for the pseudo vehicle speed by compensating for a signal value of the input information data from said longitudinal acceleration sensor by the offset value based on the lateral acceleration exerted on the vehicle owing to the turn, when the vehicle is decelerating.

2. The automotive brake control system as claimed in claim 1, wherein said lateral-acceleration arithmetic-calculation section arithmetically calculates the lateral acceleration on the basis of both the wheel-speed difference and informational data which data is representative of vehicle speed obtained at the beginning of braking action.

3. The automotive brake control system as claimed in claim 2, wherein the informational data representative of vehicle speed is the pseudo vehicle speed estimated at the beginning of braking action.

4. The automotive brake control system as claimed in claim 2, wherein said offset-value arithmetic-calculation section determines the offset value (VIDOFS) depending on whether the wheel-speed difference ($\Delta VH$) is greater than or equal to a first threshold value (4 km/h) during a low- and middle-speed turn that the informational data representative of vehicle speed is less than a predetermined middle vehicle speed (30 km/h), and determines the offset value (VIDOFS) depending on whether the wheel-speed difference ($\Delta VH$) is greater than or equal to a second threshold value (3 km/h) less than the first threshold value (4 km/h) during a middle- and high-speed turn that the informational data representative of vehicle speed is greater than or equal to the predetermined middle vehicle speed (30 km/h) and less than a predetermined high vehicle speed (100 km/h), and determines the offset value (VIDOFS) depending on whether the wheel-speed difference ($\Delta VH$) is greater than or equal to a third threshold value (2 km/h) less than the second threshold value (3 km/h) during a super-high-speed turn that the informational data representative of vehicle speed is greater than the predetermined high vehicle speed (100 km/h).

5. The automotive brake control system as claimed in claim 4, wherein said offset-value arithmetic-calculation section sets the offset value (VIDOFS) at 0.3 g when the wheel-speed difference ($\Delta VH$) is greater than or equal to the first threshold value (4 km/h) during the low- and middle-speed turn, at 0.2 g when the wheel-speed difference ($\Delta VH$) is less than the first threshold value (4 km/h) during the low- and middle-speed turn, at 0.4 g when the wheel-speed difference ($\Delta VH$) is greater than or equal to the second threshold value (3 km/h) during the middle- and high-speed turn, at 0.3 g when the wheel-speed difference ($\Delta VH$) is less than the second threshold value (3 km/h) during the middle- and high-speed turn, at 0.5 g when the wheel-speed difference ($\Delta VH$) is greater than or equal to the third threshold value (2 km/h) during the super-high-speed turn, and at 0.3 g when the wheel-speed difference (ΔVH) is less than the third threshold value (2 km/h) during the super-high-speed turn, and g denotes a gravitational acceleration unit.

6. The automotive brake control system as claimed in claim 1, wherein, when the vehicle is decelerating, said pseudo-vehicle-speed compensation section arithmetically calculates a compensated pseudo vehicle speed $Vi_{(n)}$ from a predetermined expression $Vi_{(n)}=Vi_{(n-1)}-\{(|Xg|+VIDOFS)/T_{10}\}$, where $Vi_{(n)}$ denotes the compensated pseudo vehicle speed, $Vi_{(n-1)}$ denotes a previous value of the pseudo vehicle speed extracted at each cycle of skid control, $|Xg|$ denotes an absolute value of the signal value of the input information data from said longitudinal acceleration sensor, VIDOFS denotes the offset value, and $T_{10}$ denotes a predetermined time period corresponding to each cycle of skid control.

* * * * *